(12) United States Patent
Reichert

(10) Patent No.: US 6,427,448 B1
(45) Date of Patent: Aug. 6, 2002

(54) GAS TURBINE AND METHOD OF COOLING A TURBINE STAGE

(75) Inventor: Arnd Reichert, Duisburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/701,850

(22) PCT Filed: Jun. 1, 1999

(86) PCT No.: PCT/DE99/01613

§ 371 (c)(1),
(2), (4) Date: Feb. 9, 2001

(87) PCT Pub. No.: WO99/63204

PCT Pub. Date: Dec. 9, 1999

(30) Foreign Application Priority Data

Jun. 3, 1998 (DE) .......................... 198 24 766

(51) Int. Cl.[7] .............................. F02C 5/00; F04D 29/38
(52) U.S. Cl. ...................... 60/772; 60/39.75; 415/115; 415/202; 416/97 R
(58) Field of Search .............................. 60/39.02, 39.75; 415/115, 207; 416/97 R

(56) References Cited

U.S. PATENT DOCUMENTS

| | | | |
|---|---|---|---|
| 2,896,906 A | 7/1959 | Durkin | |
| 4,302,148 A | * 11/1981 | Tubbs | 415/115 |
| 4,447,190 A | 5/1984 | Campbell | |
| 4,666,368 A | * 5/1987 | Hook et al. | 415/115 |
| 4,709,546 A | 12/1987 | Weiler | |
| 4,807,433 A | * 2/1989 | Maclin et al. | 415/115 |
| 4,815,928 A | * 3/1989 | Pineo et al. | 415/115 |
| 5,154,578 A | 10/1992 | Mirancourt et al. | |
| 5,636,659 A | 6/1997 | Smed | |
| 6,253,554 B1 | * 7/2001 | Kobayashi et al. | 60/39.75 |

FOREIGN PATENT DOCUMENTS

| | | |
|---|---|---|
| DE | 35 14354 A1 | 10/1986 |
| EP | 0 192 185 | 8/1986 |
| EP | 0 768 448 A1 | 4/1997 |
| GB | 2 170 865 A | 8/1986 |

* cited by examiner

Primary Examiner—Charles G. Freay
(74) Attorney, Agent, or Firm—Eckert Seamans Cherin & Mellott, LLC

(57) ABSTRACT

The invention relates to a gas turbine (4) having a turbine stage (24) which has a guide blade (26) and a feed (32) for cooling air (K) with a cooling-air outlet (34). The turbine stage (24) can be cooled by the cooling air (K), the cooling-air feed (32) having means via which a predeterminable pressure of the cooling air (K) can be set at the cooling-air outlet (34).

11 Claims, 2 Drawing Sheets

GAS TURBINE AND METHOD OF COOLING A TURBINE STAGE

BACKGROUND

1. Field of the Invention

The invention relates to a gas turbine and a method of cooling a turbine stage of a gas turbine by means of cooling air.

2. Related Art

A gas-turbine plant is normally used to generate electrical energy. In this case, the energy content of a fuel is utilized to produce a rotational movement of a shaft, which in turn drives a generator or a machine. During operation of the gas-turbine plant, ambient air is normally drawn in and compressed to a high pressure in an air compressor assigned to the gas turbine. The greatest proportion of the compressed air passes into one or more combustion chambers and is mixed there with the fuel, for example natural gas.

The gas/air mixture is burned, the hot combustion gases driving the shaft during their expansion to perform work. To this end, the gas turbine comprises a number of turbine blades. The latter are arranged in a plurality of turbine stages comprising guide vanes, which are in a fixed position, and moving blades, which rotate with the rotor. The air compressor of the gas-turbine plant is normally also driven via the rotary movement of the shaft produced in the gas turbine, in addition to the generator.

To increase the performance of the gas turbine and thus achieve as high an efficiency of the gas-turbine plant as possible, an especially high temperature of the combustion gases of, for example, 1000 to 1300° C. when entering the gas turbine, is aimed at. However, the upper limit for this temperature results from the thermal loading capacity of the turbine blades.

An increase in the temperature of the combustion gases may be permitted if the turbine blades are cooled in such a way that damage to the gas turbine is reliably prevented. To cool the turbine blades, partial air flows are normally extracted at the air compressor and fed as cooling air to various turbine stages. As a result, however, the air quantity which can be provided for combustion in the gas turbine is also reduced.

SUMMARY OF THE INVENTION

The object of the invention is therefore to specify a gas turbine in which the cooling-air quantity provided for cooling a turbine stage is kept small with little technical penalty. In addition, a method of cooling a turbine stage of the gas turbine is to be specified.

The object which relates to the gas turbine is achieved according to the invention by a gas turbine having a turbine stage, comprising a guide vane, and having a feed for cooling air, the feed having a cooling-air outlet, in which the turbine stage can be cooled by the cooling air, which can be fed via the cooling-air outlet to the guide blade, the feed having means by which a predeterminable pressure of the cooling air can be set at the cooling-air outlet. Cooling air can also advantageously be fed to a moving blade of the turbine stage via the guide vane.

With regard to various operating states of the gas turbine, the use of a control unit by which the means of the cooling-air feed can be controlled proves to be advantageous. This control unit measures the pressure at the cooling-air outlet, for example via a measuring line, and then activates the throttle element in accordance with the predetermined pressure, in which case the quantity of cooling air fed can be set.

Means by which the flow velocity and the flow direction of the cooling air can be set downstream of the guide vane are advantageously provided. In this way, the flow velocity and the flow direction of the cooling air, when entering the moving blade and/or the shaft, can be designed in such a way that the cooling air has the local circumferential velocity, in magnitude and direction, of the moving blade and/or of the shaft. In a further advantageous refinement of the invention, these means in this case comprise a swirl nozzle.

The turbine stage into which the cooling-air feed with the cooling-air outlet opens is advantageously a turbine stage which is arranged between a first turbine stage (high-pressure stage) and an end stage (low-pressure stage). With regard to the method of cooling a turbine stage of the gas turbine by means of cooling air, the abovementioned object is achieved according to the invention by virtue of the fact that the cooling air is fed to the guide vane of the turbine stage via a cooling-air outlet connected downstream of a cooling-air feed, a predeterminable pressure of the cooling air being set at the cooling-air outlet. In an advantageous refinement, cooling air is at the same time fed to a moving blade of the turbine stage via the guide vane. In this case, it proves to be advantageous if the flow velocity and flow direction of the cooling air are set on the outlet side downstream of the guide vane.

BRIEF DESCRIPTION OF THE DRAWINGS

An exemplary embodiment of the invention is explained in more detail with reference to the drawing, in which.

The same parts are provided with the same reference numerals in all the figures.

DESCRIPTION OF THE PREFERRED EMBODIMENT

Figure 1:
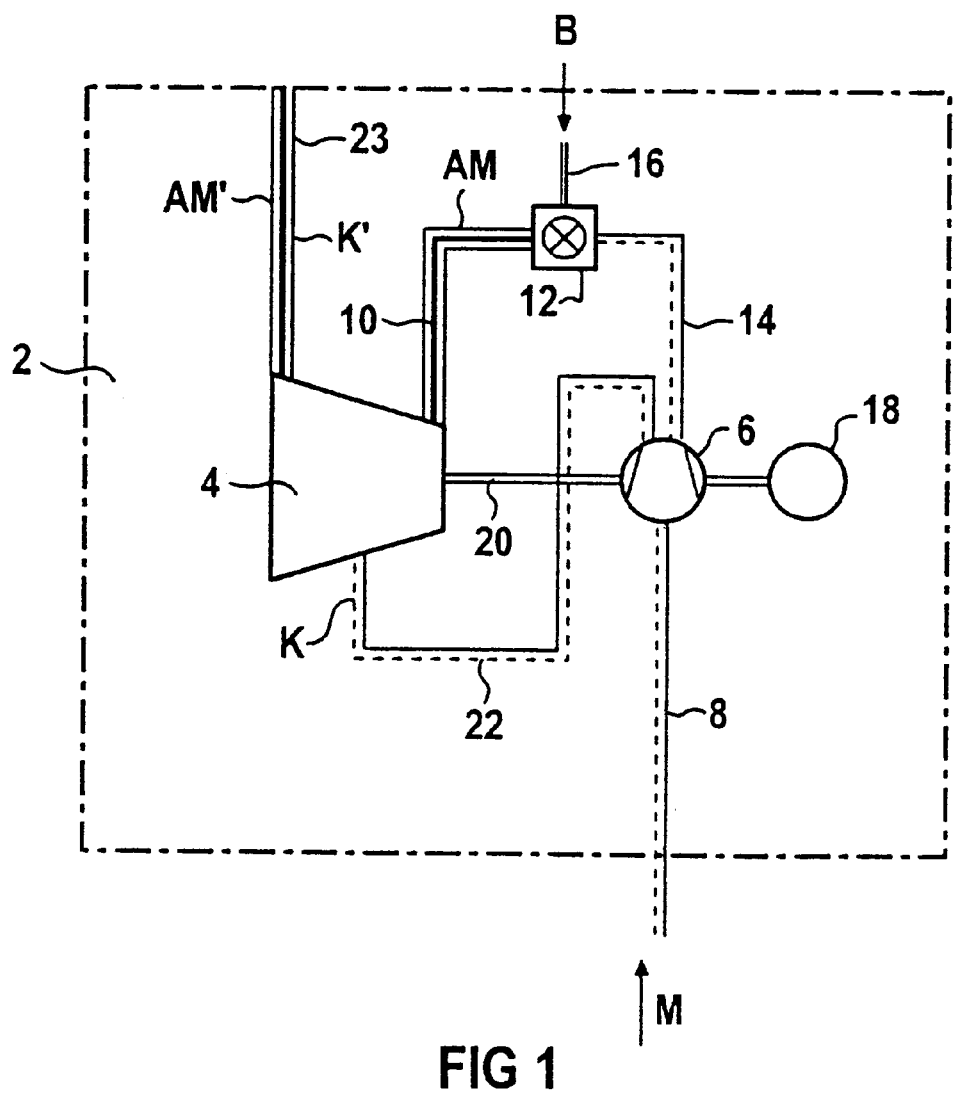
FIG. 1 schematically shows a gas-turbine plant with a gas turbine.

The invention is based upon the idea that the pressure build-up of the compressed air in an air compressor of the gas-turbine plant is not effected linearly, but progressively. In this case, the progressive pressure build-up depends on various parameters, such as ambient temperature, inlet-guide-vane cascade position and pressure ratio. The pressure prevailing at certain points of the air compressor also varies with these parameters during operation of the air compressor. If the respective pressure values are standardized with the pressure value at the air compressor outlet, these fluctuations of the pressure values at certain points of the air compressor are no longer so great, but are still present. Standarization in this case means forming a quotient from the respective pressure value at a certain point of the air compressor and the pressure value at the air-compressor outlet. It is therefore necessary to design the cooling-air system for an especially low standardized extraction pressure at a certain point of the air compressor. With increasing standardized extraction pressure, this inevitably leads to an increase in the cooling-air quantity to a greater extent than otherwise required. This result has a very adverse effect on the efficiency of the gas turbine, since the cold cooling air reduces the temperature of the working medium expanding in the gas turbine to perform work.

An excess of cooling air can be avoided if fluctuations in the pressure of the cooling air are avoided in an especially reliable manner. In this case, the pressure of the cooling air should be capable of being set with regard to various operating states of the gas turbine and the technical penalty required for this should turn out to be especially small. This is achieved by the invention by virtue of the fact that the cooling air can be fed to the turbine stage via the guide vane, in which case a predetermined pressure of the cooling air can be set at the cooling-air outlet to the guide vane.

Cooling air can advantageously be fed to a moving blade of the turbine stage via the guide vane. This is because installation of means for setting a predeterminable desired pressure value of the cooling air at the moving blade involves technical difficulties arising from the high centrifugal force load on the moving blade. These difficulties do not occur if cooling air at a certain pressure is fed to the moving blade via the guide vane.

The cooling-air feed advantageously has a throttle element as a means for controlling its pressure, preferably a throttle valve. This is because, with the throttle element, predetermined pressure of the cooling air can be set at the cooling air outlet to the guide vane in a simple manner, from the design point of view, at known flow conditions of the cooling air.

With regard to various operating states of the gas turbine, the use of a control unit by which the means of the cooling air feed can be controlled proves to be advantageous. This control unit measures the pressure at the cooling air outlet, for example via a measuring line, and then activates the throttle element in accordance with a predetermined pressure setting, in which case the quantity of cooling air fed can be set.

Means by which the flow velocity and the flow direction of the cooling air can be set downstream of the guide vane are advantageously provided as well. In this way, the flow velocity and the flow direction of the cooling air, when entering the moving blade and/or the turbine shaft, can be designed in such a way that the cooling air has the local circumferential velocity, in magnitude and direction, of the moving blade and/or of the turbine shaft. Losses of cooling air and the requisite quantity of cooling air are thus kept to a minimum. In addition, an acceleration of the cooling air leads to cooling of the same, so that adequate cooling of the moving blade is insured in a reliable manner. In a further advantageous refinement of the invention, the latter means, in the following embodiment, comprise a swirl nozzle.

The turbine stage into which the cooling air feed with the cooling air outlet opens is advantageously a turbine stage which is arranged between a first turbine stage (high pressure stage) and an end stage (low pressure stage). This is because such turbine stages are normally supplied with cooling air through the turbine shaft starting from an extraction point on the air compressor of the gas turbine plant. The supply of an intermediate turbine stage with cooling air via the guide vane enables a separate feed of the cooling air via the shaft to the moving blade of the intermediate turbine stage to be dispensed with. The separate feed through the turbine shaft previously employed by the prior art had high pressure cooling air losses associated with it.

With regard to the method of cooling a turbine stage of the gas turbine by means of cooling air, the above mentioned object is achieved according to the invention by virtue of the fact that the cooling air is fed to the guide vane of the turbine stage via a cooling air outlet connected downstream of a cooling air feed; a predetermined pressure of the cooling air being set at the cooling air outlet. In an advantageous refinement, cooling air is at the same time fed to a moving blade of the turbine stage via the guide vane. In this case, it proves to be advantageous if the flow velocity and flow direction of the cooling air are set on the outlet side downstream of the guide vane.

The advantages achieved with the invention include in particular in the fact that, due to the setting of the predetermined pressure at the cooling air outlet, fluctuations in the pressure of the cooling air are reliably prevented and the requisite quantity of cooling air is especially small. As a result, the cooling air system can be designed independently of the extraction pressure, for the requirements of the gas turbine. Furthermore, the pressure losses of the cooling air are kept especially low, since the cooling air passes via an especially short path from the guide vane into the moving blade. In addition, the efficiency of the gas turbine is increased due to the small quantity of cooling air required. If the cooling system is at the same time designed as a closed cooling system, i.e., if the cooling air is not mixed with the working medium of the gas turbine, a further increase in the efficiency of the gas turbine can thereby be achieved.

The gas-turbine plant 2, constructed in accordance with this invention and shown schematically in FIG. 1, comprises a gas turbine 4 with coupled air compressor 6. The air compressor 6 is connected on the inlet side to an intake-air line 8. A combustion chamber 12 is connected upstream of the gas turbine 4 via a line 10, for feeding working medium AM, the combustion chamber 12 being connected to a fresh-air line 14 of the air compressor 6. A fuel line 16 intended for feeding fuel B opens into the combustion chamber 12 of the gas turbine 4. The gas turbine 4 and the air compressor 6 and also a generator 18 have a common shaft 20. To feed cooling air K for the gas turbine 4, the air compressor 6 is connected to the gas turbine 4 via a number of cooling-air lines 22, of which only one is shown here. In this case, the cooling-air lines 22 may start from various points, and thus from various pressure levels, of the air compressor 6. On the outlet side, the gas turbine 4 is connected to an exhaust-gas line 23, via which expanded working medium AM' and/or heated cooling air K' leave the gas turbine.

Figure 2:
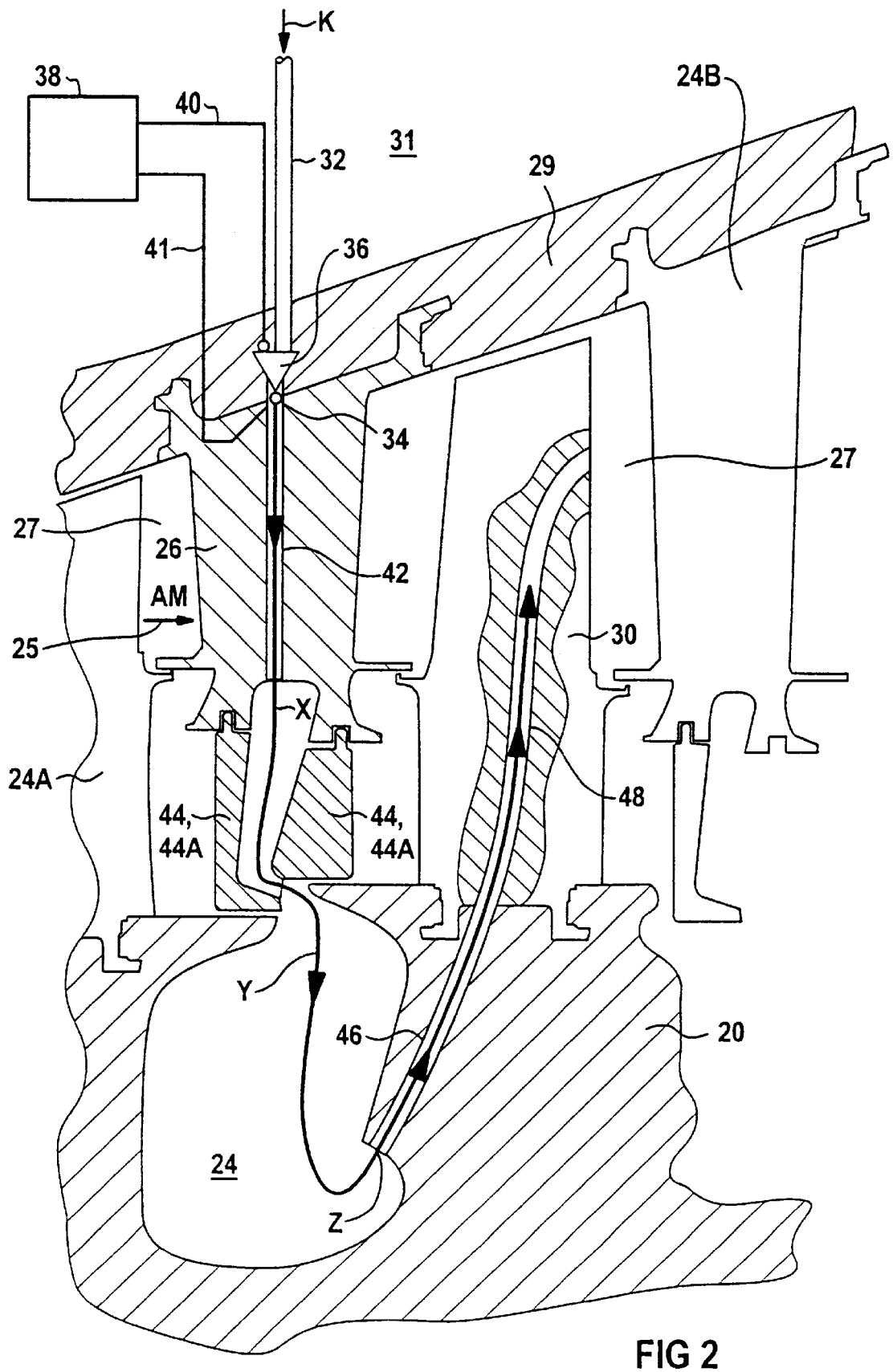
FIG. 2 schematically shows a longitudinal section through a turbine stage of the gas turbine according to FIG. 1.

A turbine stage 24 of the gas turbine 4 is shown in longitudinal section in FIG. 2. With regard to the flow direction 25 of the working medium AM of the gas turbine 4, the turbine stage 24 is located downstream of a first turbine stage 24A and upstream of the second turbine stage 24B of the gas turbine 4 in the working gas passage 27. The intermediate turbine stage 24 of the gas turbine 4 comprises a guide vane 26, which is arranged on the casing 29 of the gas turbine 4, and a moving blade 30 arranged on the shaft 20. The casing 29 of the gas turbine 4 encloses the working gas passage 27, a factor which is not shown in any more detail in the drawing. The working medium AM passes approximately horizontally in the flow direction 25 through the casing 29 of the gas turbine 4, in the course of which it is directed via guide vanes 26 and moving blades 30 of the individual turbine stages 24.

A cooling-air system 31 is provided for cooling the intermediate turbine stage 24 with cooling air K. The cooling-air system 31 has a feed 32 for cooling air K, this feed 32 being directed through the casing 29 of the gas turbine 4 and being connected to one or more of the cooling-air lines 22 in a manner not shown in any more detail. Via this feed 32 for cooling air K, cooling air K passes out of the air compressor 6 via a cooling-air outlet 34 to the guide vane 26. A throttle element 36 designed as a throttle valve is arranged in the feed 32 as means 36 for setting a predeterminable pressure of the cooling air K at the cooling-air outlet 34. Furthermore, the cooling-air system 31 comprises a control unit 38, which is connected via a connecting line 40 to the throttle element 36 and via a measuring line 41 to the cooling-air outlet 34.

The cooling-air passage 42 directed through the guide vane 26 opens on the outlet side into a swirl nozzle 44A. The swirl nozzle 44A is formed by two seals which are fastened to the shaft 20 in a manner not shown in any more detail. The seals close the gap between the guide vane 26 and the shaft 20. The swirl nozzle 44A is a means 44 by which the flow velocity and the flow direction of the cooling air K are set on the outlet side downstream of the guide vane 26. The cooling air K leaving the swirl nozzle flows into the passage 46 arranged in the shaft 20. No additional guide is required for this, since the pressure of the cooling air K leaving the swirl nozzle 44A is greater than the pressure prevailing in the passage 46. For example, the cooling air K in the swirl nozzle 44A has a pressure of 9.97 bar and a temperature of 410° C. at the point X, a pressure of 8.88 bar and a temperature of 390° C. at the point Y on the outlet side, and a pressure of 8.35 bar and a temperature of 388° C. at the point Z in the inlet region of the passage 46.

Via the passage 46 directed through the interior of the shaft 20, the cooling air K passes into a passage 48 directed in the interior of the moving blade 30. Alternatively, the cooling air K may also be fed directly to the moving blade 30. The passage 48 opens into the working gas passage 27, where mixing of the cooling air K with the working medium AM of the gas turbine 4 is effected. This admixing of cold cooling air with the working medium AM, which is hot in comparison, cools the working medium AM, as a result of which efficiency of the gas turbine is reduced.

The cooling-air system 31 is designed as an open system. In an open system, the cooling air K is mixed with the working medium AM of the gas turbine 4. Alternatively, however, a closed system may also be provided. In a closed system, the cooling air K does not pass into the working medium AM of the gas turbine 4, as a result of which the efficiency of the gas turbine can be increased.

So that the quantity of cooling air K required for cooling the gas turbine 4 is especially small, the cooling air K is fed at a predeterminable pressure via the guide vane 26 to the moving blade 30 arranged on the shaft 20. For this purpose, cooling air K is extracted from the air compressor 6 of the gas-turbine plant 2 and fed to the intermediate turbine stage 24 of the gas turbine 4 via one of the cooling-air lines 22. Via the feed 32, the cooling air K passes to the cooling-air outlet 34 connected downstream of the feed 32. A certain pressure of the cooling air K can be set at the cooling-air outlet 34 via the control unit 38. For this purpose, the control unit 38 measures the pressure of the cooling air K on the outlet side downstream of the throttle element 36 at the cooling-air outlet 34 via the measuring line 41 by means of a sensor (not shown in any more detail). Via the connecting line 40, the control unit 38 controls the opening of the throttle element 36 in such a way that the pressure predetermined by the control unit 38 prevails at the cooling-air outlet 34. From the cooling-air outlet 34, the cooling air K passes via the passage 42 provided in the guide vane 26 to the swirl nozzle 44A arranged on the outlet side downstream of the guide vane 26. The swirl nozzle 44A accelerates the cooling air K in the circumferential direction of the shaft 20 in such a way that the cooling air K, when entering the shaft 20, has the local circumferential velocity of the shaft 20 in magnitude and direction. Due to this acceleration, the temperature of the cooling air K is reduced when it enters the shaft 20. Via the passage 46 provided in the interior of the shaft 20, the cooling air K then passes into the moving blade 30 and finally into the working gas passage 27.

In the turbine stage 24, the directing of the cooling air K via the guide vane 26 to the moving blade 30 of the gas turbine 4 produces especially low pressure losses in the cooling air K, since the flow path of the cooling air K in the turbine stage 24 is especially short. In this case, cooling of the cooling air K is effected by the swirl nozzle 44A. Due to the fact that a predeterminable pressure is set at the cooling-air inlet 34 of the guide vane 26, the quantity of cooling air K is limited to the extent required for performing the cooling task. As a result, the gas-turbine plant 2 has an especially low consumption of cooling air K, which results in a relatively high efficiency of the gas turbine 4.

What is claimed is:

1. A gas turbine having a turbine stage, comprising a guide vane, the guide vane having at least one cooling channel which at an upstream end is connected in fluid communication with a feed for cooling air, the feed having a cooling-air outlet through which cooling air is introduced to the cooling channel within the guide vane, and a pressure sensor positioned proximate the cooling-air outlet and having an output representative of the pressure of the cooling air at the cooling-air outlet and first means responsive to the pressure sensor output to adjust the cooling air pressure to maintain the cooling air pressure at the cooling-air outlet at a predetermined pressure.

2. The gas turbine as claimed in claim 1, in which the turbine stage comprises a moving blade, to which cooling air can be fed via the guide vane.

3. The gas turbine as claimed in claim 1, in which the feed has a throttle element as the first means.

4. The gas turbine as claimed in 1, comprising a control unit by which the first means of the feed can be controlled.

5. The gas turbine as claimed in claim 1, comprising a second means by which the flow velocity and the flow direction of the cooling air can be set downstream of the guide vane.

6. The gas turbine as claimed in claim 5, in which the second means comprise a swirl nozzle.

7. The gas turbine as claimed in claim 1, comprising a number of turbine stages, in which the turbine stage is an intermediate turbine stage which is arranged downstream of a first turbine stage and upstream of a last turbine stage.

8. The gas turbine as claimed in claim 3 wherein the throttle element is a throttle valve.

9. A method of cooling a turbine stage of a gas turbine by means of cooling air, comprising the steps of:
   a) feeding cooling air to a guide vane of the turbine stage via a cooling-air outlet,
   b) monitoring the pressure of the cooling-air at the cooling air outlet, and
   c) adjusting the pressure of the cooling-air at the cooling air outlet in response to the monitored pressure to maintain the pressure of the cooling-air at the cooling-air outlet at a predetermined pressure.

10. The method as claimed in claim 9, in which the turbine stage comprises a moving blade, including the step of supplying cooling air to the moving blade via the guide vane.

11. The method as claimed in claim 10, in which the flow velocity and flow direction of the cooling air are set downstream of the guide vane.

* * * * *